(12) United States Patent
Assefa et al.

(10) Patent No.: US 7,738,753 B2
(45) Date of Patent: Jun. 15, 2010

(54) CMOS COMPATIBLE INTEGRATED DIELECTRIC OPTICAL WAVEGUIDE COUPLER AND FABRICATION

(75) Inventors: Solomon Assefa, Ossining, NY (US); Christopher Jahnes, Upper Saddle River, NJ (US); Yurii Vlasov, Katonah, NY (US)

(73) Assignee: International Business Machines Corporation, Armonk, NY (US)

(*) Notice: Subject to any disclaimer, the term of this patent is extended or adjusted under 35 U.S.C. 154(b) by 53 days.

(21) Appl. No.: 12/164,580

(22) Filed: Jun. 30, 2008

(65) Prior Publication Data

US 2009/0324162 A1 Dec. 31, 2009

(51) Int. Cl.
G02B 6/12 (2006.01)
G02B 6/10 (2006.01)
H01L 21/302 (2006.01)

(52) U.S. Cl. .............................. 385/49; 385/14; 385/88; 385/131; 438/31; 438/33; 216/2; 257/E21.214

(58) Field of Classification Search .................. 385/14, 385/49, 50, 129–132; 438/29, 31, 33; 216/2; 257/E21.214, 432
See application file for complete search history.

(56) References Cited

U.S. PATENT DOCUMENTS 5,471,552 A * 11/1995 Wuu et al. .................... 385/49
5,629,532 A    5/1997 Myrick
6,157,759 A * 12/2000 Seo et al. ..................... 385/49
6,631,225 B2  10/2003 Lee et al.
6,804,440 B2 * 10/2004 Lee et al. ..................... 385/114
7,181,106 B2  2/2007 Ushiro et al.
7,266,263 B2  9/2007 Ahn et al.

(Continued)

FOREIGN PATENT DOCUMENTS

JP      2003-161853      6/2003

(Continued)

OTHER PUBLICATIONS

Shoji, et al., "Low loss mode size converter from 0.3 μm square Si wire waveguides to singlemode fibres," *Electronics Letters*, Dec. 5, 2002, pp. 1669-1670, vol. 38, No. 25.

(Continued)

*Primary Examiner*—Daniel Petkovsek
(74) *Attorney, Agent, or Firm*—Jeffrey Giunta; Shimokaji & Associates, P.C.

(57) ABSTRACT

An optoelectronic circuit fabrication method and integrated circuit apparatus fabricated therewith. Integrated circuits are fabricated with an integral optical coupling transition to efficiently couple optical energy from an optical fiber to an integrated optical waveguide on the integrated circuit. Layers of specific materials are deposited onto a semiconductor circuit to support etching of a trench to receive an optical coupler that performs proper impedance matching between an optical fiber and an on-circuit optical waveguide that extends part way into the transition channel. A silicon based dielectric that includes at least a portion with a refractive index substantially equal to a section of the optical fiber is deposited into the etched trench to create the optical coupler. Silicon based dielectrics with graded indices are also able to be used. Chemical mechanical polishing is used finalize preparation of the optical transition and integrated circuit.

20 Claims, 6 Drawing Sheets

U.S. PATENT DOCUMENTS

| | | | |
|---|---|---|---|
| 7,303,339 B2 * | 12/2007 | Zhou et al. | 385/91 |
| 7,368,062 B2 * | 5/2008 | Ranganath et al. | 216/24 |
| 2002/0031304 A1 | 3/2002 | Roberts et al. | |
| 2003/0118308 A1 | 6/2003 | Bricheno | |
| 2004/0071403 A1 | 4/2004 | Lipson et al. | |
| 2005/0129366 A1 | 6/2005 | Yasaitis | |
| 2005/0185893 A1 | 8/2005 | Liu | |
| 2006/0215964 A1 * | 9/2006 | Kuroda et al. | 385/49 |
| 2007/0053643 A1 | 3/2007 | West et al. | |
| 2007/0242917 A1 * | 10/2007 | Blauvelt et al. | 385/14 |
| 2008/0002928 A1 | 1/2008 | Li | |

FOREIGN PATENT DOCUMENTS

| | | |
|---|---|---|
| JP | 2004-157530 | 6/2004 |
| JP | 2005-077315 | 3/2005 |
| JP | 2005-115117 | 4/2005 |
| JP | 2005-172448 | 6/2005 |
| JP | 2006-047894 | 2/2006 |
| JP | 2006-529055 | 12/2006 |
| WO | WO 03/060569 | 7/2003 |

OTHER PUBLICATIONS

Mizuno, et al., "Compact and Low-Loss Arrayed Waveguide Grating Module With Tolerance-Relaxed Spot-Size Converter," *IEEE Photonics Technology Letters*, Feb. 2003, pp. 239-241, vol. 15, No. 2.

Tsuchizawa, et al., "Microphotonics Devices Based on Silicon Microfabrication Technology," *IEEE Journal of Selected Topics in Quantum Electronics*, Jan./Feb. 2005, pp. 232-240, vol. 11, No. 1.

Japan Office Action dated Aug. 27, 2009.

\* cited by examiner

US 7,738,753 B2

CMOS COMPATIBLE INTEGRATED DIELECTRIC OPTICAL WAVEGUIDE COUPLER AND FABRICATION

FIELD OF THE INVENTION

The present invention relates generally to silicon circuit devices and fabrication techniques, and more particularly to forming integrated optical waveguide couplers onto optoelectronic circuits.

BACKGROUND OF THE INVENTION

Integrated semiconductor devices that include one or more photonic devices, such as photodetectors, modulators, optical switches, and the like, require a mechanism to couple optical signals between the optical fibers used to communicate optical signals to and from the semiconductor device and the silicon based waveguides that are within the semiconductor devices and used to deliver the optical signals to the photonic devices within the integrated semiconductor devices. Coupling from an optical fiber to a photonic device with input and output waveguides often suffers from loss due to index and mode-profile mismatches.

Polymer couplers are one technique used to minimize losses in coupling between an optical fiber and input and output waveguides of a photonic device embedded in an integrated semiconductor device. Polymer couplers have been demonstrated to provide effective matching and to result in low coupling losses. Optoelectronic circuits, however, are often fabricated onto integrated semiconductor devices using conventional semiconductor fabrication techniques, such as techniques for fabricating CMOS circuits. Fabricating polymer couplers for use in applications wherein the photonic devices need to be encapsulated and annealed, as in many CMOS-compatible processes, presents fabrication difficulties that increases the complexity of device fabrication.

Therefore a need exists to overcome the problems with the prior art as discussed above.

SUMMARY OF THE INVENTION

One embodiment of the present invention provides a method and structure for utilizing various dielectric materials in the formation of efficient optical couplers from optical fiber to optical devices within a semiconductor device. One embodiment of the present invention further provides a method for encapsulation of the devices and the formation of the couplers in a manner that is benign to the optical devices so that their performance is not affected. One embodiment of the invention also provides a CMOS compatible method that opens up ways for thermal treatment, electrical activation, and three-dimensional integration of optical devices. One embodiment of the present invention allows an efficiently manufactured semiconductor device that integrates photonics devices with CMOS circuit devices.

In accordance with one aspect of the present invention, a method for fabricating an integrated circuit with an integral optical coupler includes depositing at least one layer on a semiconductor die, the at least one layer comprising a chemical polishing stop layer. The method further includes etching at least one layer on a semiconductor die. The at least one layer includes a chemical polishing stop layer, and the etching the at least one layer forms a trench. The method also include depositing, into at least a portion of the trench, a silicon based dielectric that includes at least a portion with a refractive index substantially equal to a section of optical fiber. The method additionally includes etching the at least one layer to the chemical polishing stop layer, by a chemical mechanical polishing process after the depositing the silicon based dielectric. The etching by the chemical mechanical polishing causes a portion of the silicon based dielectric to remain in the trench below the chemical polishing stop layer. The method also includes removing, after the etching the at least one layer, the chemical polishing stop layer.

In accordance with another aspect of the present invention, an optoelectronic circuit with an integral optical coupling transition includes an integrated semiconductor device including an integrated optoelectronic circuit and at least one optical waveguide fabricated on a single semiconductor substrate, where the at least one optical waveguide has a respective first end. The optoelectronic circuit with an integral optical coupling transition also includes at least one silicon based dielectric optical transition adapted to couple the respective first end of at least one of the at least one optical waveguide and an optical fiber. The at least one silicon based dielectric optical transition is fabricated according to a process that includes depositing at least one layer on a semiconductor die. The at least one layer comprising a chemical polishing stop layer. The at least one silicon based dielectric optical transition is fabricated according to a process that further includes etching a trench into the at least one layer at least through the chemical polishing stop layer. The etching the at least one layer forming a trench. The at least one silicon based dielectric optical transition is fabricated according to a process that also includes depositing, into at least a portion of the trench, a silicon based dielectric that has at least a portion with a refractive index substantially equal to a section of optical fiber. The at least one silicon based dielectric optical transition is fabricated according to a process that further includes etching the at least one layer to the chemical polishing stop layer, by a chemical mechanical polishing process after the depositing the silicon based dielectric, the etching by the chemical mechanical polishing causing a portion of the silicon based dielectric to remain in the trench below the chemical polishing stop layer. The at least one silicon based dielectric optical transition is fabricated according to a process that also includes removing, after the etching the at least one layer, the chemical polishing stop layer.

In accordance with another aspect of the present invention, an optoelectronic circuit with an integral optical coupling transition includes a first integrated semiconductor die and a second integrated semiconductor die. At least one of the first integrated semiconductor die and the second integrated semiconductor die includes an integrated optoelectronic circuit, and the first integrated semiconductor die is mounted on top of the second integrated semiconductor die so as to form a three-dimensional integrated circuit. At least one of the first integrated semiconductor die and the second integrated semiconductor die includes at least one optical waveguide, the at least one optical waveguide has a respective first end. At least one of the first integrated semiconductor die and the second integrated semiconductor die further includes a silicon based dielectric optical transition adapted to couple the respective first end of at least one of the at least one optical waveguide and an optical fiber. The silicon based dielectric optical transition being fabricated according to a process that includes depositing at least one layer on a semiconductor die, the at least one layer comprising a chemical polishing stop layer. The silicon based dielectric optical transition being fabricated according to a process that further includes etching a trench into the at least one layer at least through the chemical polishing stop layer. The etching the at least one layer forms a trench. The silicon based dielectric optical transition being fabricated according to a process that also includes depositing, into at least a portion of the trench, a silicon based dielectric including at least a portion with a refractive index substantially equal to a section of optical fiber. The silicon based dielectric optical transition being fabricated according to a process that additionally includes etching the at least one layer to the chemical polishing stop layer, by a chemical mechanical polishing process after the depositing the silicon based dielectric, the etching by the chemical mechanical polishing causing a portion of the silicon based dielectric to remain in the trench below the chemical polishing stop layer. The silicon based dielectric optical transition being fabricated according to a process that also includes removing, after the etching the at least one layer, the chemical polishing stop layer.

In accordance with another aspect of the present invention, an optoelectronic circuit fabrication apparatus adapted to fabricate an integrated circuit with an integral optical coupling transition includes a layer deposition processor adapted to deposit at least one layer on a semiconductor die, the at least one layer comprising a chemical polishing stop layer. The optoelectronic circuit fabrication apparatus further includes an etching processor adapted to etch at least one layer on a semiconductor die. The at least one layer comprising a chemical polishing stop layer, the etching the at least one layer forming a trench. The optoelectronic circuit fabrication apparatus also includes a dielectric depositing processor adapted to deposit, into at least a portion of the trench, a silicon based dielectric comprising at least a portion with a refractive index substantially equal to a section of optical fiber. The optoelectronic circuit fabrication apparatus additionally includes a chemical mechanical polisher adapted to etch the at least one layer to the chemical polishing stop layer, by a chemical mechanical polishing process after the dielectric depositing processor deposits the silicon based dielectric, the etching by the chemical mechanical polishing causing a portion of the silicon based dielectric to remain in the trench below the chemical polishing stop layer. The optoelectronic circuit fabrication apparatus also includes a chemical polishing stop layer etcher adapted to remove, after the etching the at least one layer, the chemical polishing stop layer.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
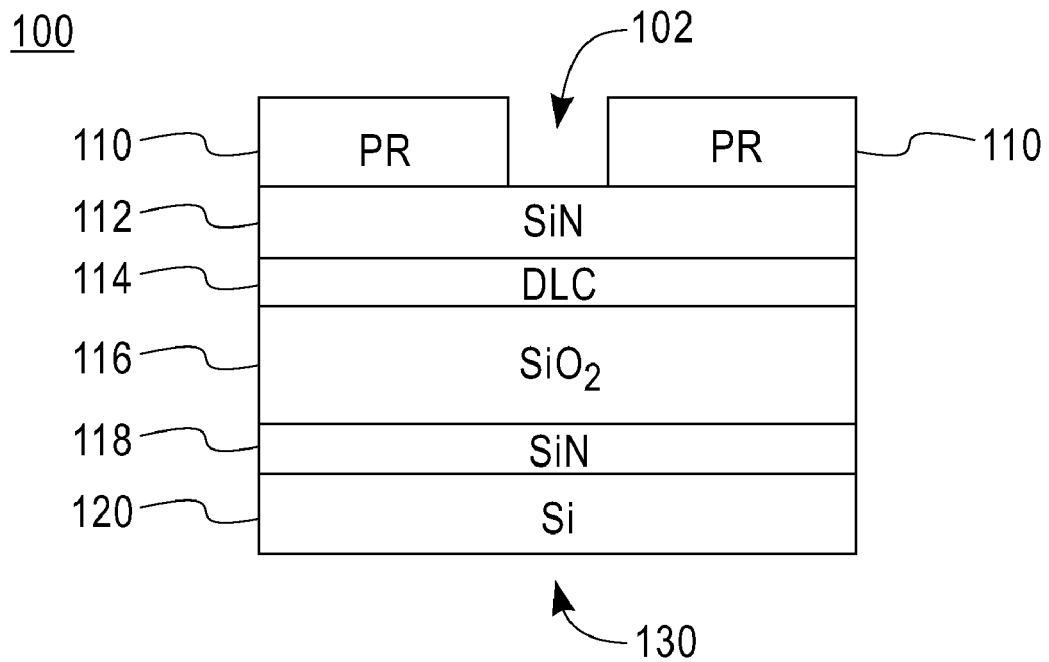
FIG. 1 illustrates a first fabrication phase for a silicon based semiconductor die, in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward.

FIG. 1 illustrates a first fabrication phase 100 for a silicon based semiconductor die 130, in accordance with one embodiment of the present invention. The first fabrication phase 100 shows a silicon based semiconductor die 130 that has an integrated silicon device 120 consisting of conventional integrated electronic and/or optoelectronic circuits fabricated on a single semiconductor substrate. In one embodiment, the silicon based semiconductor die 130 includes electronic circuits and/or optoelectronic circuits that include, for example, embedded silicon optical waveguide structures that have been fabricated on the silicon device 120 according to conventional techniques. Such a silicon based semiconductor device 120 is accepted by one embodiment of the present invention for further fabrication of a dielectric based optical coupler, as is described below. In one embodiment, the silicon device 120 is part of a conventional silicon wafer. Alternatively, the fabrication processing described below is able to be performed before the metal levels of CMOS devices are formed on the silicon based semiconductor die 130.

Figure 9:
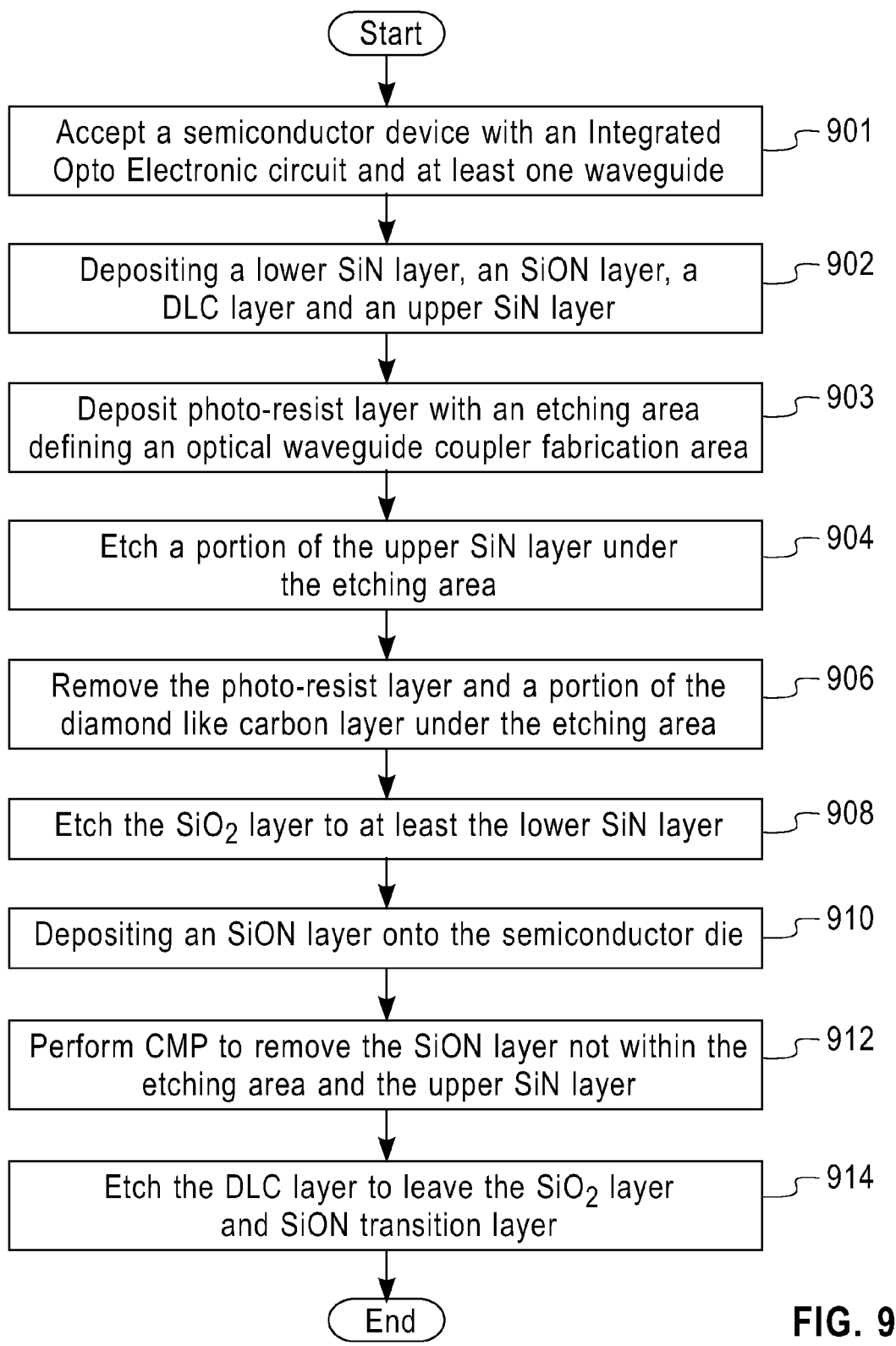
FIG. 9 illustrates an integrated waveguide coupler fabrication process flow diagram in accordance with one embodiment of the present invention.

FIG. 9 illustrates a flow chart of a fabrication method 900 for forming a dielectric based optical coupler, in accordance with one embodiment of the present invention. The fabrication method 900 is described below with further reference to several sections views illustrating various processing stages.

One embodiment of the present invention accepts, at step 901, a semiconductor device, such as a silicon based semiconductor substrate 120, that may or may not already have electronic and/or optoelectronic circuits fabricated thereon. The fabrication method 900 continues by preparing, at step 902, the semiconductor device 120 by depositing several layers on top of the semiconductor device 120. As mentioned above, various embodiments of the present invention are able to process semiconductor devices after fabrication of the metal levels of the device. E.g., the fabrication method 900 is able to be performed on devices that already have electronic and/or optoelectronic circuits fabricated thereon. Further embodiments of the present invention are able to perform the fabrication method 900 before fabrication of the metal layers of the semiconductor device. E.g., the fabrication method 900 is able to accept semiconductor substrates that do not have circuitry fabricated thereon but that will have electronic and/or optoelectronic circuits formed thereon after the described processing.

As is illustrated for the first fabrication phase 100 utilized by one embodiment of the present invention, a lower SiN layer 118, an SiO$_2$ layer 116, a Diamond Like Carbon (DLC) layer 112, an upper SiN layer 112, and a photo-resist (PR) layer 110 are deposited, in order, on top of the semiconductor device 120. In the illustrated embodiment, the Diamond Like Carbon (DLC) layer 112 is a Chemical Mechanical Polishing (CMP) stop layer that allows layers deposited above the CMP stop layer to be etched by a CMP process but the CMP process will stop etching at the DLC layer 112. In further embodiments of the present invention, the DLC layer 112 is able to be formed with any material similar to Diamond Like Carbon that will serve as a CMP stop layer.

The lower SiN layer 118 of the illustrated embodiment is used when performing the fabrication method after fabrication of the metal levels on the semiconductor device 120. In various embodiments of the present invention, the ordered layers above the silicon device 120 are able to be placed either in conjunction with or after the fabrication of the optoelectronic circuits on the silicon device 120.

The first fabrication phase 100 illustrates the Photo-Resist (PR) layer 110 defining an etching area 102 that corresponds to an area in which a dielectric waveguide coupler will be fabricated onto the semiconductor die 130. The deposition of the photo-resist layer 110, at step 903, is achieved in one embodiment of the present invention according to conventional techniques.

Figure 2:
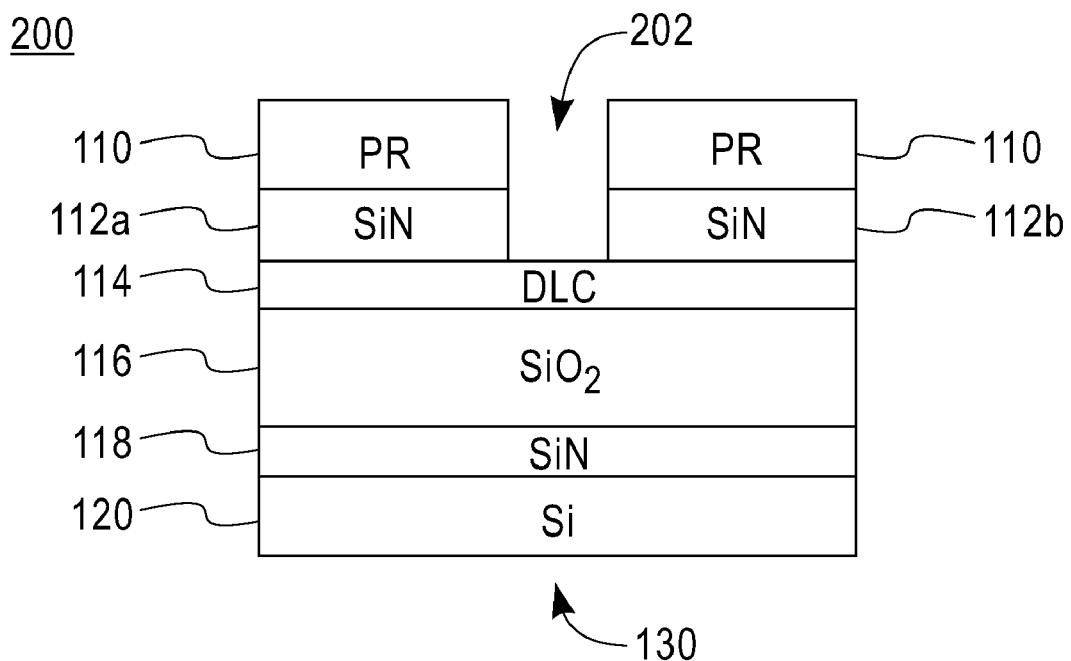
FIG. 2 illustrates a second fabrication phase for a silicon based semiconductor die 130, in accordance with one embodiment of the present invention.

FIG. 2 illustrates a second fabrication phase 200 for a silicon based semiconductor die 130, in accordance with one embodiment of the present invention. In this second fabrication phase, an initial trench 202 is etched, at step 904, into the upper SiN layer 112 according to the Photo-Resist layer 110. The etching of the upper SiN layer 112 in one embodiment is performed by conventional techniques and leaves two portions of the upper SiN Layer 112, a first upper SiN layer 112a and a second upper SiN layer 112b. In one embodiment, a number of trenches are etched in close proximity to each other so as to create trenches for a dense array of optical couplers.

Figure 3:
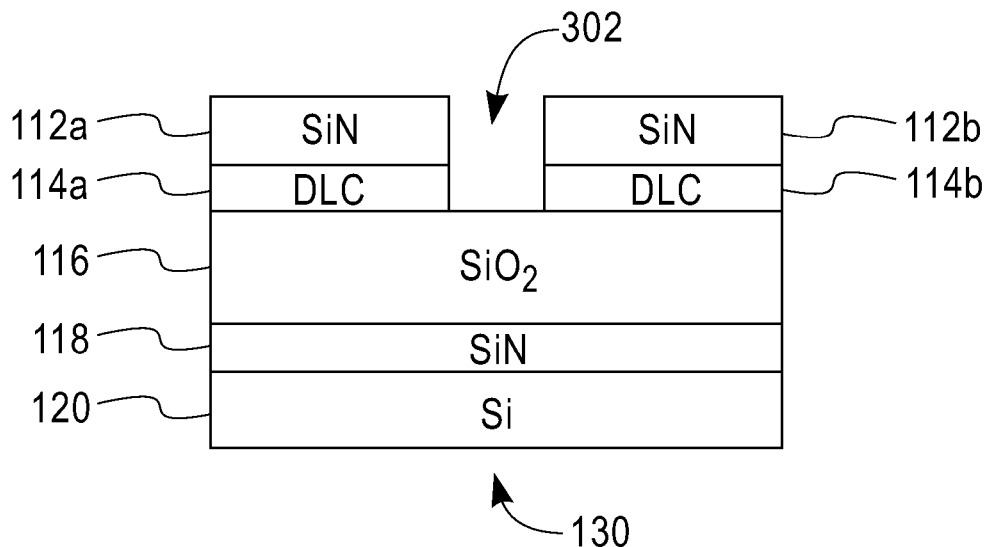
FIG. 3 illustrates a third fabrication phase for a silicon based semiconductor die, in accordance with one embodiment of the present invention.

FIG. 3 illustrates a third fabrication phase 300 for a silicon based semiconductor die 130, in accordance with one embodiment of the present invention. In this third fabrication phase 300, the Photo-Resist layer 110 is removed, at step 906, along with the portion of the Diamond Like Carbon (DLC) layer 114 that is under the initial trench 202 that was previously etched. The third fabrication phase 300 extends the initial trench 202 by creating a Diamond Like Carbon (DLC) layer deep trench 302. In the third fabrication phase for the silicon based semiconductor die 300, the Diamond Like Carbon (DLC) layer deep trench 302 exposes the portion of the SiO$_2$ layer that is below the DLC layer deep trench and leaves a first Diamond Like Carbon (DLC) layer 114a and a second Diamond Like Carbon (DLC) layer 114b on respective sides of the Diamond Like Carbon (DCL) layer deep trench 302. The Photo-Resist layer 110 and the Diamond Like Carbon (DLC) layer deep trench 302 in one embodiment are etched according to conventional techniques.

Figure 4:
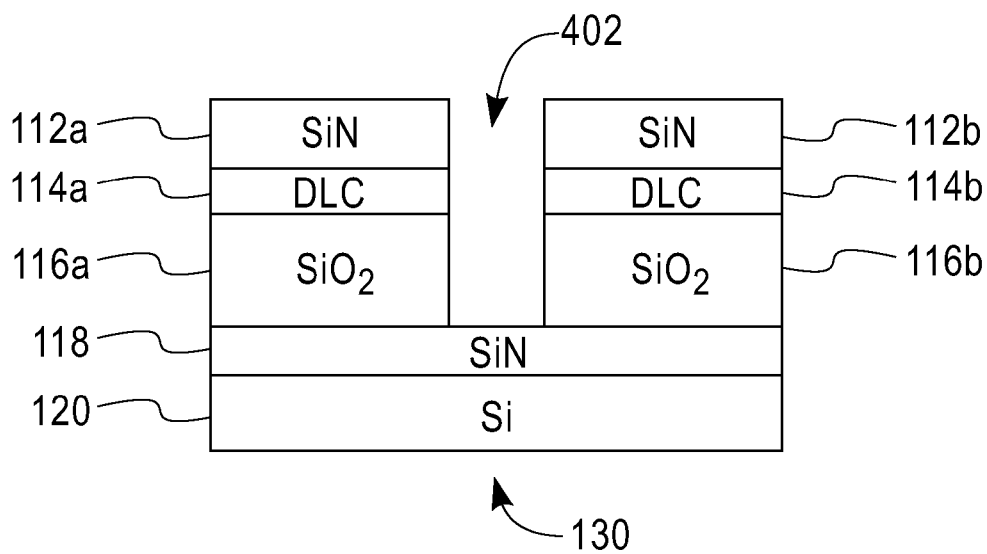
FIG. 4 illustrates a fourth fabrication phase for a silicon based semiconductor die 130, in accordance with one embodiment of the present invention.

FIG. 4 illustrates a fourth fabrication phase 400 for a silicon based semiconductor die 130, in accordance with one embodiment of the present invention. In this fourth fabrication phase 400, the DLC layer deep trench 302 is deepened by etching the portion of SiO$_2$ layer 116 that is under the DLC layer deep trench 302, at step 908, to the lower SiN layer 118. The fourth fabrication phase 400 of one embodiment etches the SiO$_2$ layer 116 to the lower SiN layer 118. By using chemistries that are selective to silicon, the etch of further embodiments can also be deepened further below the lower SiN layer 118 so that a tip of a Si waveguide tip that is, for example, connected to optoelectronic circuits on the semiconductor die protrudes either within or beneath into the trench. The etching of the SiO$_2$ layer 116 leaves two sides of the SiO$_2$ Layer 116, a first SiO$_2$ layer side 116a and a second SiO$_2$ layer side 116b. After the fourth fabrication phase 400, a coupler trench 402 is left that extends from the upper SiN layer 112 through the SiO$_2$ layer 116. In further embodiments, the coupler trench can be further etched to layers below the lower SiN layer 118

Figure 5:
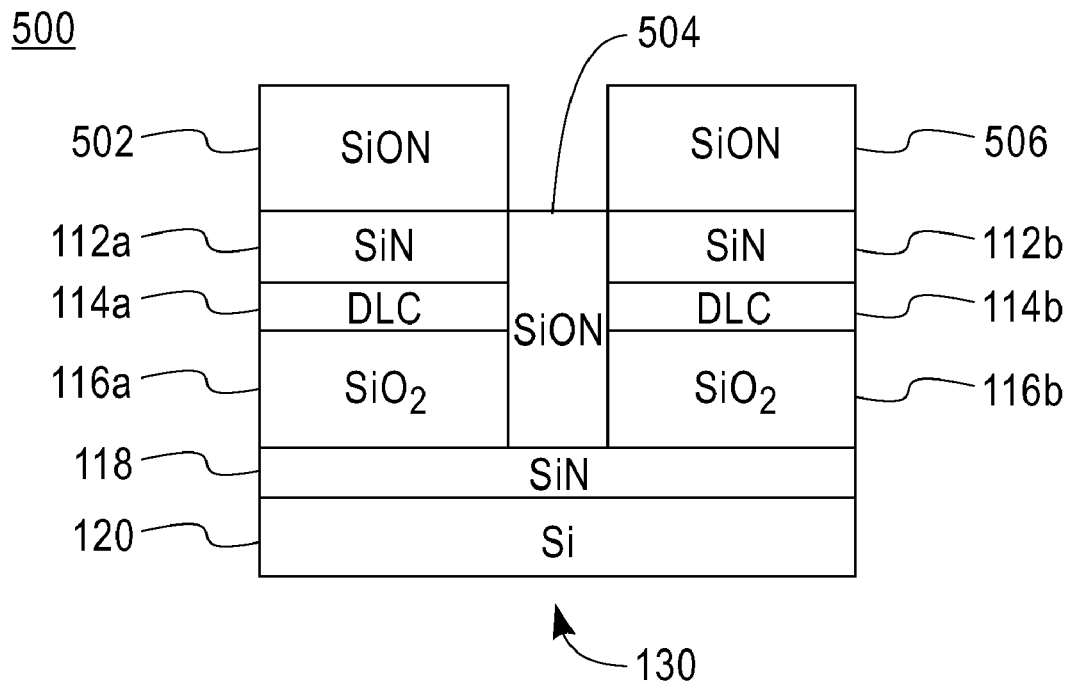
FIG. 5 illustrates a fifth fabrication phase for a silicon based semiconductor die, in accordance with one embodiment of the present invention.

FIG. 5 illustrates a fifth fabrication phase 500 for a silicon based semiconductor die 130, in accordance with one embodiment of the present invention. The fifth fabrication phase 500 includes uniform deposition, at step 910, of an SiON layer onto the semiconductor die 130. The deposited SiON layer of one embodiment includes a first SiON layer 502, a second SiON layer 506, and an SiON coupler 504. The SiON coupler 504 is deposited into the coupler trench 402 and will form an optical waveguide coupler between an optical fiber and an optical waveguide that is fabricated onto the semiconductor die 130. In various embodiments, the optical waveguide is able to be located one of within and beneath the coupler trench 402. Further embodiments of the present invention fabricate optical waveguide couplers similar to the SiON coupler 504 by using any dielectric material with an optical index, or graded optical index, that is suitable for matching the mode profile used in the optical fiber to which the coupler will be connected. For example, further embodiments are able to form optical couplers from silicon based dielectric materials such as SiN, or SiO2. In one embodiment, the dielectric used to form the coupler is able to have a graded optical index where the optical index transitions from a low to a high value.

Figure 6:
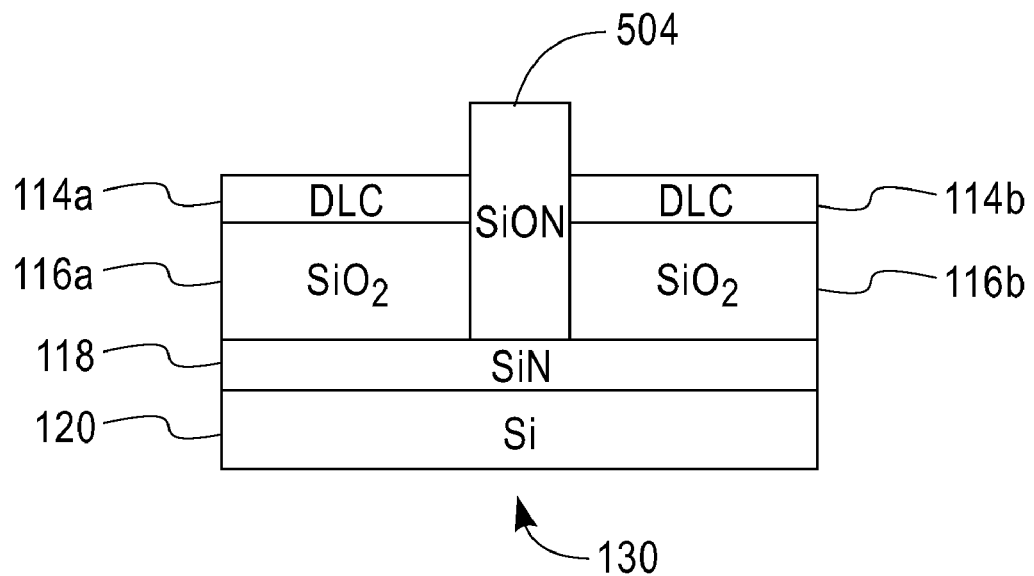
FIG. 6 illustrates a sixth fabrication phase for a silicon based semiconductor die, in accordance with one embodiment of the present invention.

FIG. 6 illustrates a sixth fabrication phase 600 for a silicon based semiconductor die 130, in accordance with one embodiment of the present invention. In this sixth fabrication phase, Chemical Mechanical Polishing (CMP) is used, at step 912, to remove the first SiON layer 502, the second SiON layer 506, the first upper SiN layer 112a and the second upper SiN layer 112b.

Figure 7:
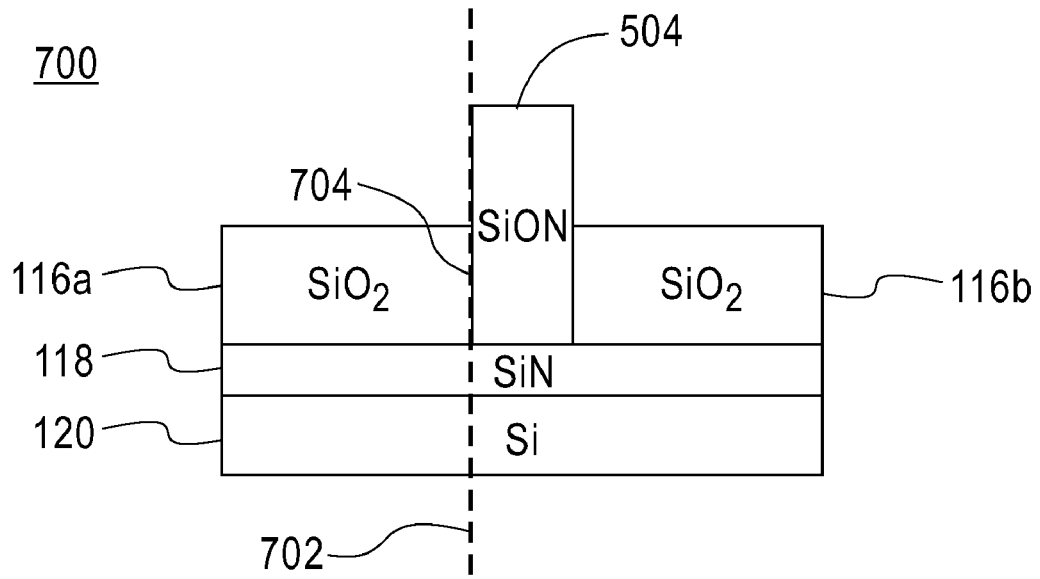
FIG. 7 illustrates a seventh fabrication phase for a silicon based semiconductor die, in accordance with one embodiment of the present invention.

FIG. 7 illustrates a seventh fabrication phase 700 for a silicon based semiconductor die 130, in accordance with one embodiment of the present invention. In this seventh fabrication phase, the first Diamond Like Carbon (DLC) layer 114a and the second Diamond Like Carbon layer 114b are etched, at step 914, to leave the first SiO2 layer 116a and the second SiO2 layer 116b along with the SiON coupler 504. Etching of the DLC layer is used in embodiments where the fabrication method 900 is performed after fabrication of metal levels on the semiconductor device 120, so that the metallization levels are exposed. The seventh fabrication phase 700 further cleaves the semiconductor die 130 along a cleave line 702 so as to expose one face 704 of the SiON coupler 504.

Figure 8:
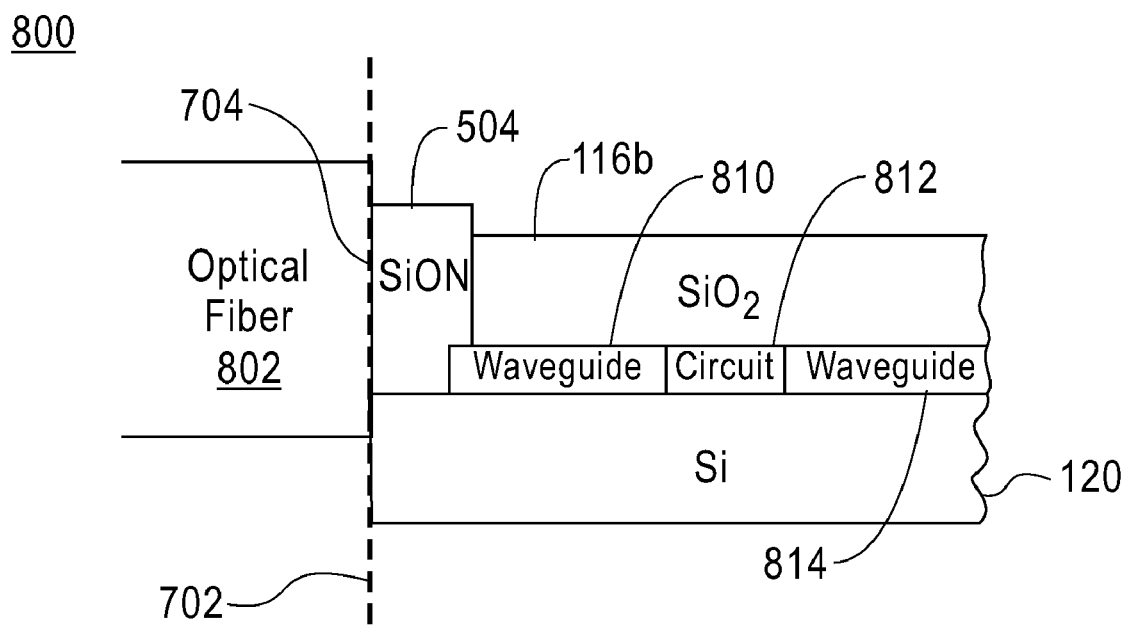
FIG. 8 illustrates a complete optical fiber to on-chip waveguide device, in accordance with one embodiment of the present invention.

FIG. 8 illustrates a complete optical fiber to on-chip waveguide device 800, in accordance with one embodiment of the present invention. The complete optical fiber to on-chip waveguide device 800 includes the semiconductor die 130 that has been cleaved along cleave line 702 to expose an exposed face 704 of the SiON coupler 504. An optical fiber 802 is attached to the exposed face 704 of the SiON coupler 504 that had been fabricated onto the semiconductor device 120.

A first silicon waveguide 810 is shown to connect optical energy between the SiON coupler 504 and optoelectronic circuits 812 located within the semiconductor circuit 120.

One end of the first silicon optical waveguide 810 is shown to extend into a part of the coupler 504 that is opposite the exposed one face 704. The first silicon optical waveguide 810 is tapered and extends under a part of the above described etched trench, and therefore extends under part of the coupler 504, to cause efficient adiabatic coupling between the SiON coupler 504 and the first silicon optical waveguide 810. The first silicon waveguide 810 further extends under the second SiO2 layer 116b and connects to an optical transceiver, for example, within optoelectronic circuits 812. The first silicon optical waveguide 810 and the optoelectronic circuits 812 in one embodiment were fabricated onto the semiconductor device 120 by using conventional techniques prior to the above described fabrication of the SiON coupler 504.

One embodiment of the present invention performs the above described process for fabricating efficient optical couplers into CMOS devices either before or after forming the CMOS metal levels on the CMOS devices. In applications where the optical couplers are formed after forming the CMOS metal levels, the optical couplers are able to be capped with a thin SiN layer prior to depositing the DLC layer 114. In applications that are required to expose the metal levels, the CMP step can be used, or some other techniques such as wet etch can be used. Alternative embodiments are able to use other mask levels to build further metal levels that are connected to the underlying metal level. In one embodiment, optical couplers are able to be fabricated before any metal levels are built.

Further embodiments of the present invention incorporate optical waveguides that are fabricated with other high index materials. Further embodiments of the present invention use optical waveguides, such as the first optical waveguide 810, made of, for example, Group III-V materials such as GaAs, InP, and the like.

The above described optical coupler fabrication technique allows the fabrication of dense arrays of optical couplers. The above fabrication technique allows many optical couplers to be formed close to each other so that, for example, a dense array of couplers can be created on a photonic circuit to allow multiple optical fibers to be connected to the photonic circuits through an optical coupler that will optimize the transfer of optical energy between the optical fiber and the photonic circuits.

Figure 10:
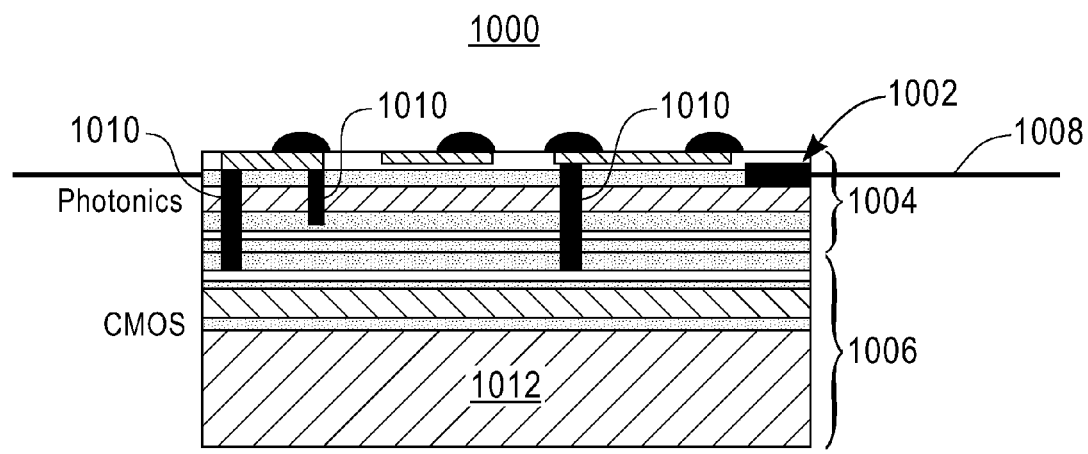
FIG. 10 illustrates a first three-dimensional integrated circuit, in accordance with one embodiment of the present invention.

FIG. 10 illustrates a first three-dimensional integrated circuit 1000, in accordance with one embodiment of the present invention. The first three-dimensional integrated circuit 1000 includes a photonics layer 1004 and a CMOS digital circuit layer 1006. The photonics layer 1004 is first formed on a wafer through conventional photonic circuit fabrication techniques that include forming an optical coupler 1002 according to the above described process. The optical coupler 1002 is connected to an optical fiber 1008 to allow communications of optical signals to and from the optoelectronic circuits of the photonics layer 1004. The CMOS digital circuit layer 1006 is formed on a second wafer using conventional digital CMOS fabrication techniques and is integrated with the photonic wafer containing the photonics layer 1004. In one embodiment, the optical couplers are able to be formed after the step of bonding the two wafers.

The first three-dimensional integrated circuit 1000 of one embodiment is fabricated using conventional methods by placing circuits of the photonic layer 1004 on top of a CMOS digital circuit layer 1006 that includes a substrate 1012. Circuits of the photonics layer 1004 and the CMOS digital circuit layer 1006 are electrically connected by vias 1010. The inclusion of an optical coupler fabricated by the above CMOS-friendly fabrication process facilitates the fabrication of the first three-dimensional integrated circuit 1000 through conventional CMOS fabrication equipment and techniques.

Figure 11:
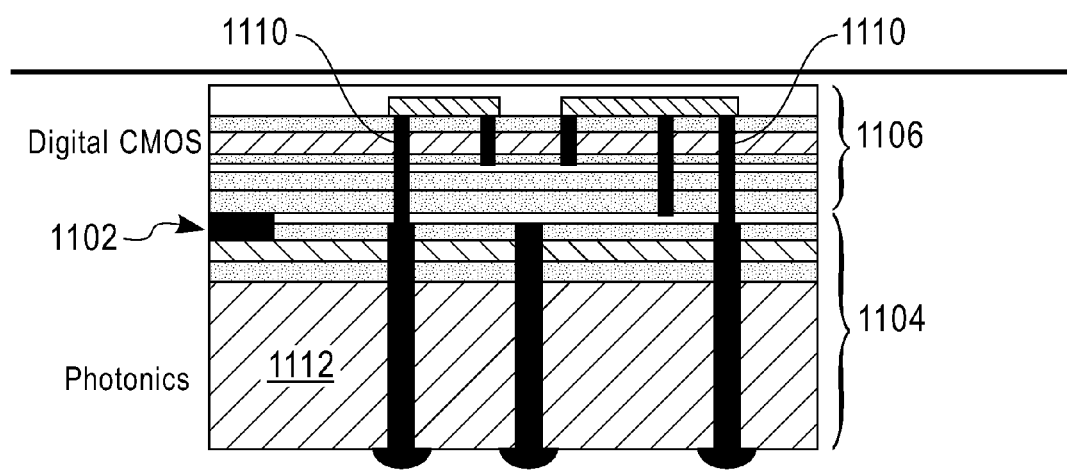
FIG. 11 illustrates a second three-dimensional integrated circuit, in accordance with one embodiment of the present invention.

FIG. 11 illustrates a second three-dimensional integrated circuit 1100, in accordance with one embodiment of the present invention. The second three-dimensional integrated circuit 1100 includes a photonics layer 1104 and a CMOS digital circuit layer 1106. The photonics layer 1104 is first formed on a wafer through conventional photonic circuit fabrication techniques that include forming an optical coupler 1102 according to the above described process. The optical coupler 1102 is connected to an optical fiber 1008 to allow communications of optical signals to and from the optoelectronic circuits of the photonics layer 1104. The CMOS digital circuit layer 1106 is formed on a second wafer using conventional digital CMOS fabrication techniques and is integrated with the photonic wafer containing the photonics layer 1104.

The second three-dimensional integrated circuit 1100 of one embodiment is fabricated using conventional methods by placing circuits of the CMOS digital circuit layer 1106 on top of the photonic layer 1104 that includes a substrate 1112. Circuits of the photonics layer 1004 and the CMOS digital circuit layer 1006 are electrically connected by vias 1010. The photonics layer 1102 has a CMOS friendly optical coupler 1102 that was fabricated using the above described technique that allows the optical coupler 1102 to be sandwiched in between the photonics layer 1104 and the CMOS digital circuit layer 1106.

Optical signals generated by circuit 812 are able to be delivered to the first optical waveguide 810 and transferred from the first optical waveguide 810 to the optical fiber 802 through the SiON coupler 504, which acts as an optical impedance matching structure that is formed onto the semiconductor die 130 using the above fabrication steps. Similarly, and depending on a direction of communications through the optical coupler 804, optical signals are able to be transferred from the optical fiber 802 to the first optical waveguide 810 for further communication to the circuit 812. As described above, further embodiments of the present invention can be used to fabricate optical waveguide couplers similar to the SiON coupler 504 by using any dielectric material with an optical index, or graded optical index, that is suitable for matching the mode profile used in the optical fiber 802. In one embodiment, the dielectric used to form the coupler is able to have a graded optical index where the optical index transitions from a low to a high value.

The complete optical fiber to on-chip waveguide device 800 further shows a second silicon optical waveguide 814 that transfers optical energy from the optoelectronic circuits 812 to, for example, other optoelectronic circuits within the complete optical fiber to on-chip waveguide device 800, or to another SiON coupler that is fabricated on another area of the device.

As is clear to one of ordinary skill in the art in light of the present discussion, the above steps are compatible with conventional CMOS fabrication techniques. The use of the above or equivalent fabrication techniques allows efficient fabrication of semiconductor dies 130 that include embedded waveguides along with an optical impedance matching coupler 504 that allows efficient direct coupling to conventional optical fibers 802.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others.

In general, unless otherwise indicated, singular elements may be in the plural and vice versa with no loss of generality.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The method as described above is used in the fabrication of integrated circuit chips.

The resulting integrated circuit chips can be distributed by the fabricator in raw wafer form (that is, as a single wafer that has multiple unpackaged chips), as a bare chip, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard, or other input device, and a central processor.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the of the present invention.

What is claimed is:

1. A method for fabricating an integrated circuit with an integral optical coupler, the method comprising:
   depositing a plurality of layers on a semiconductor die comprising the integrated circuit and at least one optical waveguide, the plurality of layers comprising, in order, a silicon dioxide layer, a chemical mechanical polishing stop layer in contact with the silicon dioxide layer, and an upper silicon nitride layer in contact with the chemical mechanical polishing stop layer;
   etching the plurality of layers on the semiconductor die, the etching the plurality of layers forming a trench above a first end of the at least one optical waveguide;
   depositing, into at least a portion of the trench, a silicon based dielectric comprising at least a portion with a refractive index substantially equal to a section of optical fiber;
   etching the plurality of layers to the chemical mechanical polishing stop layer, by a chemical mechanical polishing process after the depositing the silicon based dielectric, the etching by the chemical mechanical polishing causing a portion of the silicon based dielectric to remain in the trench below the chemical mechanical polishing stop layer;
   removing, after the etching the plurality of layers to the chemical mechanical polishing stop layer, the chemical mechanical polishing stop layer;
   cleaving the semiconductor die substantially perpendicularly to a side of the trench so as to expose one surface of the silicon based dielectric; and
   joining the section of optical fiber to the one surface of the silicon based dielectric.

2. The method of claim 1, wherein the silicon based dielectric comprises Silicon Oxynitride.

3. The method of claim 1, wherein the silicon based dielectric comprises a graded index that transitions from a low value to a high value along an axis perpendicular to the one surface of the silicon based dielectric.

4. The method of claim 1, wherein the chemical mechanical polishing stop layer comprises diamond like carbon.

5. The method of claim 1, wherein an integrated optoelectronic circuit is connected to a respective second end of at least one of the at least one optical waveguide.

6. The method of claim 1, wherein the method is performed using a semiconductor die that has integrated digital circuits and optoelectronic circuits communicatively coupled to a respective second end of at least one of the at least one optical waveguide.

7. The method of claim 1, further wherein the etching the plurality of layers on the semiconductor die comprises etching a plurality trenches in close proximity to each other so as to create trenches for an array of optical couplers.

8. The method of claim 1, further comprising integrating the semiconductor die into a three-dimensional integrated circuit, the integrating comprising bonding a second semiconductor die to the semiconductor die, and wherein the integrating occurs either one of before or after the depositing the layer, the etching the plurality of layers on the semiconductor die, the depositing the silicon based dielectric, the etching the plurality of layers to the chemical mechanical polishing stop layer and the removing.

9. The method of claim 1, wherein the semiconductor die comprises CMOS electronic circuits that are fabricated by conventional CMOS fabrication equipment, and wherein the depositing on the semiconductor die, etching the plurality of layers on the semiconductor die, depositing the silicon based dielectric, etching the plurality of layers to the chemical polishing top layer of the semiconductor die by a chemical mechanical polishing process and removing the chemical mechanical polishing stop layer are performed by the conventional CMOS fabrication equipment.

10. The method of claim 9, wherein the CMOS electronic circuits are fabricated one of before and after the depositing on the semiconductor die, etching the plurality of layers on the semiconductor die, depositing the silicon based dielectric, etching the plurality of layers to the chemical polishing top layer by a chemical mechanical polishing process and removing the chemical mechanical polishing top layer.

11. The method of claim 1, wherein the depositing the plurality of layers on a semiconductor die further comprises depositing, prior to depositing the silicon dioxide layer, a lower silicon nitride layer, the silicon dioxide layer being in contact with the lower silicon nitride layer.

12. The method of claim 1, wherein the etching the plurality of layers on the semiconductor die comprises:
   etching, in accordance with a photo resistive mask on a top surface of the semiconductor die, the trench into the upper silicon nitride layer, a lower silicon nitride layer, the diamond like carbon layer and the silicon dioxide region, wherein a first end of an optical waveguide is located one of within and beneath the trench, and wherein the top surface comprises the upper silicon nitride layer.

13. An optoelectronic circuit on a silicon die with an integral optical coupling transition, comprising:
an integrated semiconductor device comprising an integrated optoelectronic circuit and at least one optical waveguide fabricated on a single semiconductor substrate, the at least one optical waveguide having a respective first end;
at least one silicon based dielectric optical transition adapted to couple the respective first end of at least one of the at least one optical waveguide and an optical fiber, the at least one silicon based dielectric optical transition being fabricated according to a process comprising:
depositing a plurality of layers on the semiconductor die, the plurality of layers comprising, in order, a silicon dioxide layer, a chemical mechanical polishing stop layer in contact with the silicon dioxide layer, and an upper silicon nitride layer in contact with the chemical mechanical polishing stop layer;
etching a trench into the plurality of layers at least through the chemical mechanical polishing stop layer, the etching the layer forming a trench above the first end of the at least one optical guide;
depositing, into at least a portion of the trench, a silicon based dielectric comprising at least a portion with a refractive index substantially equal to a section of optical fiber;
etching the plurality of layers to the chemical mechanical polishing stop layer, by a chemical mechanical polishing process after the depositing the silicon based dielectric, the etching by the chemical mechanical polishing causing a portion of the silicon based dielectric to remain in the trench below the chemical mechanical polishing stop layer;
removing, after the etching the layer, the chemical mechanical polishing stop layer;
cleaving the semiconductor die substantially perpendicularly to a side of the trench so as to expose one surface of the silicon based dielectric; and
joining the section of optical fiber to the one surface of the silicon based dielectric.

14. The optoelectronic circuit with an integral optical coupling transition of claim 13, wherein the silicon based dielectric comprises Silicon Oxynitride.

15. The optoelectronic circuit with an integral optical coupling transition of claim 13, wherein the silicon based dielectric comprises a graded index that transitions from a low value to a high value along an axis perpendicular to the one surface of the silicon based dielectric.

16. The optoelectronic circuit with an integral optical coupling transition of claim 13, further comprising CMOS electronic circuits, and wherein the CMOS electronic circuits and the integrated optoelectronic circuit are communicatively coupled to a respective second end of at least one of the at least one optical waveguide.

17. The optoelectronic circuit with an integral optical coupling transition of claim 13, wherein the at least one silicon based dielectric optical transition comprises a plurality of silicon based dielectric optical transitions located in close proximity to each other so as to create an array of optical couplers.

18. An optoelectronic circuit with an integral optical coupling transition, comprising:
a first integrated semiconductor die; and
a second integrated semiconductor die,
wherein at least one of the first integrated semiconductor die and the second integrated semiconductor die comprises an integrated optoelectronic circuit,
wherein the first integrated semiconductor die is mounted on top of the second integrated semiconductor die so as to form a three-dimensional integrated circuit,
wherein at least one of the first integrated semiconductor die and the second integrated semiconductor die comprises at least one optical waveguide, the at least one optical waveguide having a respective first end; and
wherein at least one of the first integrated semiconductor die and the second integrated semiconductor die further comprises a silicon based dielectric optical transition adapted to couple the respective first end of at least one of the at least one optical waveguide and an optical fiber, the silicon based dielectric optical transition being fabricated according to a process comprising:
depositing a plurality of layers on a semiconductor die, the layer comprising a chemical mechanical polishing stop layer;
etching a trench into the plurality of layers at least through the chemical mechanical polishing stop layer, the etching the plurality of layers forming a trench above the first end of the at least one optical waveguide;
depositing, into at least a portion of the trench, a silicon based dielectric comprising at least a portion with a refractive index substantially equal to a section of optical fiber;
etching the plurality of layers to the chemical polishing stop layer, by a chemical mechanical polishing process after the depositing the silicon based dielectric, the etching by the chemical mechanical polishing causing a portion of the silicon based dielectric to remain in the trench below the chemical mechanical polishing stop layer;
removing, after the etching the plurality of layers, the chemical mechanical polishing stop layer;
cleaving the semiconductor die substantially perpendicularly to a side of the trench so as to expose one surface of the silicon based dielectric; and
joining the section of optical fiber to the one surface of the silicon based dielectric.

19. An optoelectronic circuit fabrication apparatus adapted to fabricate an integrated circuit with an integral optical coupling transition, the optoelectronic circuit fabrication apparatus comprising:
a layer deposition processor adapted to deposit a plurality of layers on a semiconductor die comprising the integrated circuit and at least one optical waveguide, the plurality of layers comprising, in order, a silicon dioxide layer, a chemical mechanical polishing stop layer in contact with the silicon dioxide layer, and an upper silicon nitride layer in contact with the chemical mechanical polishing stop layer;
an etching processor adapted to etch the plurality of layers on the semiconductor die, the etching the plurality of layers forming a trench above a first end of the at least one optical waveguide;
a dielectric depositing processor adapted to deposit, into at least a portion of the trench, a silicon based dielectric comprising at least a portion with a refractive index substantially equal to a section of optical fiber;

a chemical mechanical polisher adapted to etch the plurality of layers to the chemical mechanical polishing stop layer, by a chemical mechanical polishing process after the dielectric depositing processor deposits the silicon based dielectric, the etching by the chemical mechanical polishing causing a portion of the silicon based dielectric to remain in the trench below the chemical mechanical polishing stop layer; and a chemical polishing stop layer etcher adapted to remove, after the etching the layer, the chemical mechanical polishing stop layer;

a semiconductor cleaver adapted to cleave the semiconductor die substantially perpendicularly to a side of the trench so as to expose one surface of the silicon based dielectric; and a optical fiber section joiner adapted to join the section of optical fiber to the one surface of the silicon based dielectric.

20. The optoelectronic circuit fabrication apparatus of claim 19, further wherein the etching processor is further adapted to etch a plurality of trenches in close proximity to each other so as to create trenches for an array of optical couplers.

* * * * *